Patented Aug. 18, 1931

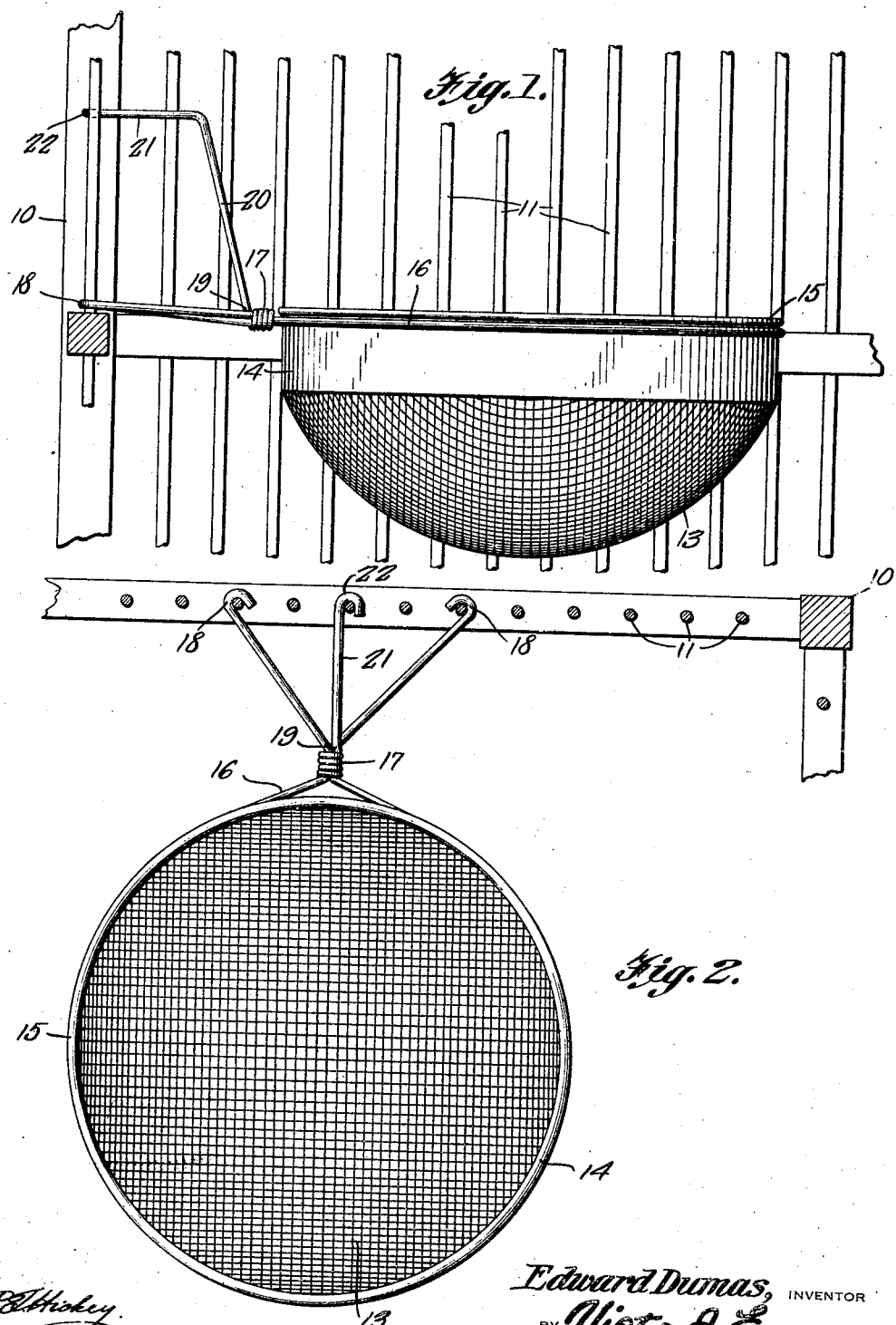

1,819,877

UNITED STATES PATENT OFFICE

EDWARD DUMAS, OF MARQUETTE, MICHIGAN

BIRD NEST HOLDER

Application filed December 28, 1927. Serial No. 243,089.

The present invention relates to bird nest holders for use in breeding cages and has for its object to provide a holder of this character which will prevent befouling the floor and furnishings in proximity of the cage.

Other objects are simplicity of construction and cheapness of manufacture and which may be readily removed or replaced within the cage.

Other objects are to so provide the nest holder that there will be afforded a sufficient resiliency to prevent the injuring of eggs in the course of incubation due to a sudden jar or other causes.

Other objects and advantages will appear from the following specification and will be set forth in the subjoined claim.

In the drawings:—

Figure 1 shows a fragment of a cage with my invention attached thereto and in side elevation.

Figure 2 is a similar view showing the invention in plan view.

Referring to the drawings in detail, 10 designates a cage having the usual wire strands 11 secured to frame members 12, said wire members being spaced apart a suitable distance. 13 is a nesting cup which may be formed of any suitable material as wire netting and is in the shape of the ordinary coffee strainer having a band 14 thereabout and an outstanding flange 15 at its upper and open end. This cup is designed to afford a support for the nest built by the mother bird and is attached to the cage in a manner which I believe to be novel and which attachment constitutes the subject matter of my invention. In order to attach the device to the cage so that it will hang in spaced relation to the sides of the cage, I provide a wire 16 in which is formed a loop sufficient to receive and support the cup 13 with the flange 15 resting on the wire of the loop, the loop being twisted together at 17 and the ends diverging from this point and having hooks 18 at their ends adapted to be hooked around the wires of the cage as shown clearly in Figure 2. A second wire is wrapped around the wire 16 at the point where the wires are twisted about each other as shown at 19 and is extended upwardly as at 20 and then horizontally at 21 having a hook 22 at its end adapted to be hooked together with a wire of the cage. The spreading of the wire 16 prevents disconnection of the hooks 18 from the wires and the weight of the nest prevents disconnection of the hook 22.

When it is desired to secure the nest to the cage, the ends 18 are spread slightly apart so as to encompass the wire far enough apart to hold the wire ends under tension. The cup member 13 may be removably connected with the loop and may be taken therefrom for cleaning and the hooks 18 and 22 may be readily removed from the cage wires by an outward pressure of the side hooks at 18.

Having described my invention what I claim is:—

A bird nest holder including a nest receiving member of circular formation, a resilient member bent in circular formation to frictionally engage the holder and having the end portions twisted about themselves adjacent the circular formation and extended to provide diverging and resilient arms having the ends bent in opposite directions to provide oppositely disposed hooks to engage the bars of a cage, and a second resilient member having one end twisted about the twisted portion of the first member and extending upwardly and outwardly from the holder and having the free end bent to engage the bar of the cage located between the bars engaged by the first mentioned hooks.

In testimony whereof I affix my signature.

EDWARD DUMAS.